7190X
B. Reilley,
Vapor Bath,
Patented July 31, 1832.
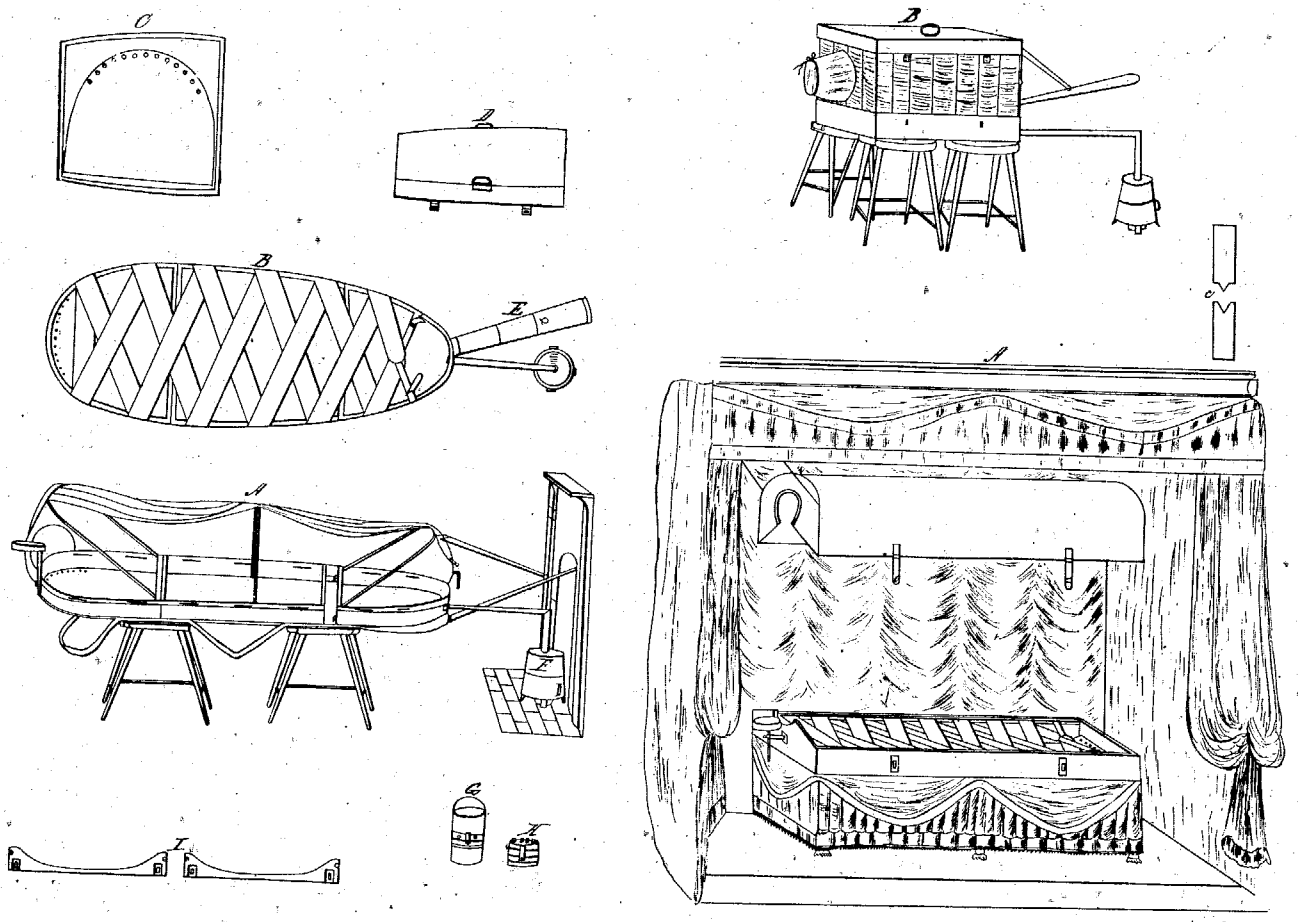
N. PETERS, PHOTO-LITHOGRAPHER, WASHINGTON, D. C.

No. [illegible] ov 12

7190X July 31. 1832 35

Boyd Reilly

The Schedule referred to in these Letters Patent and
making part of the same, containing a description in
the words of the said Boyd Reilly himself of his improve-
ment in Apparatus for applying either simple or medicated
vapour or steam to the surface of the Human body, being an
improvement on his former Patent dated February 5th 1831.

---

To all to whom these Presents may come. Be it known
that I Boyd Reilly of the City of Philadelphia in the County
of Philadelphia and State of Pennsylvania having obtained
Letters Patent on the 6th day of February one thousand eight
hundred and thirty one, for a new and useful improvement
in Apparatus for applying either simple or Medicated Steam
to the surface of the human body with perfect ease and safety
in the chamber of the sick: having made considerable im-
provements in the same of which the following is a full and
exact description. Plate 1st Figure A represents a
machine which separates into three divisions, each part
calculated to fit easily into the other, by which means the length of the
Machine, when packed up, is reduced nearly two thirds with-
out adding to the thickness. The top cover appears raised at
the side, to show the three bows by which it is supported; the
foot division is detached to show the fastenings by which it
is united to the centre division: the false bottom is also deta-
ched, as it necessarily must be to permit the separation of
the foot division The shape of the frame is an egg oval.
at the head a full round, to accommodate the shoulders of the
patient; at the foot made more acute for the conven-
ience of packing up also to afford as much swell as possi-
ble to the sides in order that the top and bottom covers
may pass the above. The divisions of the frame are in
length as follows the head division 20 inches and a

[illegible]

half thro' the centre; the middle division 27 inches, & the foot
division 18 inches and a half. The frame of the middle divi-
sion is made of seasoned wood, ash cherry &c. the side
pieces of this frame, 4 inches in depth & 7/8 of an inch in
thickness; the length already given; they are swept [illegible]
to the part of the oval they belong to. a stretching rail of the
same breadth and thickness is dovetailed into each end of the
frame. the one at the upper end 25 inches in length. the
one at the lower end twenty three, these stretching rails
are hollowed out from the upper edge three inches in the cen-
tre to make room for the body of the patient; they are glued
in & further secured by a wooden pin passing through the
dove tails from top to bottom, that is 4 inches. The head
division is formed by a piece of hickory or white oak (if
green it will bend better) 4 inches in depth and three quar-
ters of an inch in thickness, bent to the shape of the head of the
frame on a block or frame, after being prepared by boiling or
steaming and then dried in the sun or with a fire to keep
it in shape; the ends are secured by a stretching rail 3/4 of
an inch in thickness and to correspond in shape with the
one in the middle division. the foot division is formed
by a similar bent piece made to the shape of the acute end
of the oval & five eighths of an inch in thickness. stretching rail
the same; these bent pieces are lightened on the bottom
edge, between the dove tails, to a half inch in thickness.
The patient reclines on broad girth or "straining web"
as described in my former specification, some change in the
division of it is necessary in consequence of the division of the fra-
me. this is shown on plate [illegible] figure 13. the mortices
are made to receive the girthing seven eighths of an inch
from the upper edge of the frame; it is to be observed that
the girthing is invariably entered from the inside of the frame
which will permit the mortices to be cut to the breadth of the girthing. The girthing being taken out whenever this machine
is packed up. the ends are fastened with a strap and buckle
of inch and half girthing or leather. they should be strong with
buckles tinned or plated. and attached by a strap to the frame.
A piece of strong blanket 12 inches in breadth is extended
along the centre of the girthing and fastened by the ends
lapping under and taking a large horn button on the out
side of the frame. Two circular hollows are cut half an inch
in breadth and one eighth of an inch depth in the centre.
except at the head of the frame. where they should be gradually
deepened to permit the piece that supports the cushion for
the head of the patient; to move up and down; the use
of these hollows being to receive the edges of the top and bot-
tom covers, One of these hollows is a full eighth of an
inch from the bottom of the girthing mortises, the other is the
same distance from the lower edge of the frame. The upper
edge of the frame and the girthing mortises must be made
round and smooth so as to keep the girthing from chafing.
The bottom of the middle division is covered with stout sheet
tin trimmed close to the bottom on the sides but project-
ing a quarter of an inch at each end to cover the joints when
the end divisions are attached; the projecting ends should
be doubled, to give them strength and the cut edge should be
returned under the frame to protect it from the action of
the vapour. The head and feet divisions may be covered with
a lighter tin as all unnecessary additions to the weight
of the machine should be avoided; the bottom of the head division
should be perforated with twelve half inch holes one inch
apart; close to the inside of the head of the frame, these holes
are to permit the escape of the vapour between the bottoms;
the tin bottoms are fastened on with stout cut tacks which
should be tinned. The frame and bottoms should be pain-
ted with some strong colour not extracted from lead The end divisions are attached to the middle division by strong wrought iron latches, rivetted into plates of stout sheet iron, the long or rivet end being made square in order to prevent its turning; the plates with the latches attached, are let into the stretching rails of the end divisions three inches from the ends or outside of the frame, & as near to the lower edge as the strength of the plates will admit of, as the pushing when pressed by the weight of the patient, draws the joints close above; these plates are secured by a stout flat headed screw at each corner; the latches should not project more than five eighths of an inch from the plates, lest they should penetrate thro' the opposite stretching rail and be exposed to the vapour; these latches are received by similar sheet iron plates let into the opposite stretching rail; and which the latch at the bottom is pressed, after it has entered the plate, these fastenings should be well tinned. The bows which support the top cover, are made of hickory or white oak they are made round and half an inch in diameter, the bow for the head must not exceed the length of the middle division, as it must be packed up inside of the case. it is fastened by passing the ends, which should taper a little, thro' the two stretching rails, nearest the head and close to the inside of the head division. Which will cause it to be let into the sides of the middle division one eighth of an inch being the difference in thickness; the holes are bored thro' the stretching rails in such a direction as to elevate the centre of the bow 17 inches above the top of the frame; the centre of the bow should stand in two inches from a line that would be perpendicular to the outside of the head of the frame. The centre bow is like the head bow in shape, but wider in span as occupying the widest part of the frame, it ranges on the top in a straight line with the head and foot bows; it is placed at the upper end of the centre girthing [illegible] and not at the lower end as erroneously marked on the drawing;) it is fastened by being let into the side piece one quarter of an inch. the bottom is [illegible] down the side to within one inch of the bottom; a tin plate or half circular form covers the ends and is fastened on with tin tacks.

The foot bow is bent to the shape of the foot of the machine, fas=tened like the head bow, is elevated 15 inches from the top of the frame and stands in 4 inches from the perpendicular line. which permits the cover to be put on and taken off with more ease. The head of the patient rests on a circular board, 6 inches in diameter, covered and softly stuffed with wool or curled hair; a tin socket is fastened on the bottom of the board one inch from the edge, this socket is one inch and half in de-pth and is made to receive the end of a sliding stick 10 inches in length, one inch and a quarter in breadth and five eighths in thickness, rounded on one side to a half circle. the flat side rests against the head of the machine and is kept in its place by a brass socket, fitting round it & fastened with screws to the head of the frame; a short thumb screw is let into the centre of the socket which keeps the cushion elevated or depressed at the pleasure of the patient. this fastening will be better understood as the familiar fastening of a barbers chair; it is much more simple and cheap than the one on my model. The best material I have found for the cover, is light twilled muslin, it should be stretched on a frame the twilled side within or from you a coat of white wash is laid on first, made of good Spanish Whiting and of such a consis-tance as not to run thro; the object of this first coat being to prevent the preparation hereafter mentioned running thro' before the white wash has time to dry, follow with a light coat of the following preparation; To the varnish described in my first specification add stone ochre sufficient to give it a [illegible] body not so strong however as if for common paint. lay on a sufficient number of coats to close up the pores of the linen which can be ascertained by holding it against the light.
Muslin three quarters of a yard wide is the proper breadth. When
it is thoroughly dry it should be passed round the frame, seamed
at the head and foot and thro' the centre; if an outer cover
is used the seam may be on the outside; the cover should fit easy
as it will shrink a little; the lower edge of the cover is secured
by a stout cord such as that used for sash weights. it should
be well stretched, a leather strap sewed at one end and a three
quarter roller buckle to the other. the cord is sewed loosely into
the edge of the cover the strap and buckle at the foot the centre of
the cord made fast at the centre of the head; this cord draws the
edge of the cover into the circular hollow already described.
A circular hole 12 inches in diameter, is cut in the centre of
the head of the cover. a tin hoop of the same diameter one inch
breadth with a stout wire in each edge to keep it from slipping
is secured in this opening by a band made of a single thickness
of strong silk oil cloth. which is sewed with silk or thin mus-
lin and one edge sewed round the opening. the other edge, in
which is a drawing string, is passed thro' the tin hoop & being
returned on the outside is drawn tight with the string,
the band being made just deep enough for this purpose, which
will be about one inch and a half; this tin hoop also receives
the edge of a bag; which is placed round the neck of the patient
and described in my first eight. For the folding portable
machine. this top cover should have an outer cover of silk, or
some light woollen fabric, as being folded up while warm it
may adhere together. The false bottom is made of the painted
muslin cut to the shape of the bottom, allowance being made
for the seam. it has a border two inches wide or deep, in the
narrowest part but widening gradually towards the foot,
in order to receive the end of the escape pipe, to which an o-
val hole is cut in the border, on one side of the centre of the
foot, so as to be out of the way of the pipe from the [illegible]
[illegible]

band with a drawing string is [illegible] round the edge of
the hole to secure the end of the escape pipe in the same man-
ner as the tin hoop is described above, The escape pipe is
made of three pieces of tin 12 inches in length fitting one with-
in the other so as to occupy only the space of one; and sufficiently
tapering to keep them from separating when drawn out; the
smallest end of this pipe should be double the capacity of the pipe
which admits the vapour, this end should be flattened to an
oval form of about an inch across, so as not to cut away
too much of the border of the false bottom, the wide end of this
escape pipe is put up the chimney of the bed chamber. & is
kept up against the breast of the chimney by a double string
which is fastened to the outside of the top cover of the foot, a
ring or loop being fastened to the outer division of the es-
cape pipe to receive this string. It should have been observed
that the upper edge of the false bottom border has a cord strap &
buckle sewed in it like the top cover. The manner of rais-
ing the vapour is described in the first specification, the
folding portable apparatus however requires a few alterations,
it is premised that the heating apparatus is packed up with-
in the frame, which is 4 inches in depth, therefore it must
be put up in this space the lamp is found to burn better with
wicks and pure alcohol, it should therefore have four sockets
for wicks in the lid, the wicks large one in the center, the
other divided round it. these wicks should be always pressed
out after using or they will not burn well, the lamp, inclu-
ding the lid, & wick sockets should measure 4 inches scant in
depth and be of capacity to hold a pint: the supporters for the ves-
sel containing the material to be raised instead of being rivet-
ed to the lamp must be riveted to a band which fits round
the top of the lamp, and rests on projections either raised or riv-
eted on the sides these pieces should raise the vessel above
the lamp one inch and half, to keep the vessel from slipping off. they should be set off and turned square up.
When the lamp is to be packed up this rim or band is ta-
ken off the top of the lamp and slipped on the bottom and
then stowed inside of the tin vessel or saucepan which con-
tains the material to be raised in vapour; the breadth &
depth of this vessel being regulated by the size of the lamp
when thus packed up. The cap under which the lamp &c
are placed is made tapering and divided in the centre, so
that the upper division shall go inside of the lower division
and both be placed over the lamp &c when packed up. the lower
division of the cap is 8 inches diameter at the bottom & four
inches deep. it is made of light sheet iron to prevent [illegible]
by the solder, tinned inside and has a handle rivited to the
side, it stands on three feet. which raise it three inches from
the ground. these feet are made of sheet iron with the edges tur-
ned over to give them strength. they also turn up inside with
a hinge. so as to preserve the depth of 4 inches; the upper division
is made of tin. it fits over the lower division when the
cap is used, but goes inside of it when packed up. for which
purpose the cap is made just sufficiently tapering, it is 4 in-
ches deep including the half inch projection on the top which
goes into the pipe. The tin pipe which conveys the va-
pour into the machine is one inch and quarter diameter &
two feet in length a joint in the middle with an elbow
sufficiently long to bring it nearly level, the end which goes
into the foot of the machine between the two hollows is flat-
ened to half an inch, so as not to cut away the frame too much,
a tin pipe receives it which passes thro' the foot of the frame
the wood is cut away a little over this pipe, so that the heat
may not scorch it. this pipe is kept in its place by a tin
plate 4 inches long and inch and half wide, the end of the
pipe is turned over this plate at the edges & the plate let
flush into the frame. a similar plate [illegible] over the end of the pipe inside of the frame, & is fastened with tinned tacks; the pipe should project over this plate one inch to keep the hot gas from scorching the wood. the pipe is secured from being pushed out by a brass plate somewhat longer than the tin which is fastened by four small wood screws.

The machine is prepared for use by first attaching the end divisions, putting on the false bottom, drawing the strap and buckle tight at the foot, place the four chairs under the joints, taking care not to put them under the bottom farther than necessary to make it steady, as they will obstruct the passage of the escaping vapor. it is a good way to place the patient first, then fix the chairs; the centre of the girthing should be marked, so that the ends may come out even, the girthing should be tightened by degrees, like a sacking bottom cord: a strip of stout blanket 12 inches wide, goes on the centre of the girthing, from head to foot and is fastened by a strap of narrow girthing, and a large bone button sewed on the bottom of the blanket at both ends. The tin hoop which is round the patients neck should be fastened in its place in the cover, and the lower edge of the cover put in its place at the head of the machine, so that the cushion for the head of the patient may be screwed in its place the cover is then turned over on the floor at the head of the machine, until the hoops or bows are put in their places over the patient, when the cover is turned over the edges placed in the bottom & the strap and buckle drawn tight the bag which has been previously placed round the patients neck is then secured round the tin hoop by fastening the drawing string carefully between the wire edges: the escape pipe is then attached and the lamp lighted. Should the patient [illegible] flannel it had better be taken off. Should the patient be so tall that his feet will come over the opening at the foot, he should be directed to separate them. The machine is packed up by placing the foot division across the inside of the [illegible]

divission, place the lamp and cap packed up as already
described, inside of it; slip the cushion off the stick that supports
it. place them both inside; the escape pipe also. after shoving
the joints together; after which the fitting &c in a little practice
will soon make the packing up easy; the head division is
then turned bottom upwards over all the hoops or bows
laid on the top. the covers folded as thin as possible and laid
between the bows. a tin flask containing alcohol may be
fitted to one of the corners, a tin case which may be black
japanned, is fitted to it; a strong wire should go round the
lower edge of this case: it has no bottom. the bottom of the
middle division answering the purpose; the case is fastened
on by two hasps on each side, which fit on a turned iron stud
screwed into the lower edge of the middle division. the studs
have holes in them thro' which a spring key passes. which keeps
the hasp in its place; these keys are fastened to the case with small
chains.

Apparatus for Hospitals and families

For these purposes the Machine need not take apart; they
may be made with two pieces, of the same depth and thick-
ness as the head division, bent to the shape of the head and
foot & left long enough to be joined at each side in the centre,
by being lapped 6 or 8 inches, the lapp called by carpenters
the dove tailed carp joint is the (best) then glued and screw-
ed; three stretching rails of the same thickness but com-
ing no higher up than the fitting mortices; one of these
stretching rails let in one eighth of an inch in the centre
of the frame; each of the others midway between the centre &
the ends. fastened by glueing and nailing thro' the sides:
the false bottom may be tacked on the frame; the lamp
made without the moving hand; the cap need not be made
tapering nor to divide in the centre, nor for the foot to turn
up with a hinge; a projecting loop or [illegible] handle should be fixed to the centre of each side: and the girthing mortis-
es may be brought at least one inch nearer together and an
additional mortise cut on each side.

A fixed Apparatus.

As shewn on plate 2, it is an oblong frame 6 feet long
from out to out, by two feet six inches wide & 6 inches deep:
the frame is made of two thicknesses of seven eighth white pine
stuff glued together; the sap and heart edge being carefully
put together, to keep it from springing; It may be lapped glued and nailed at the corners or dovetailed the circle round the
neck 14 inches in diameter: a projecting wooden rim
receives the bag round the neck, the rim projects one
inch, is three quarters thick, should be slightly hollowed on
the outer edge to receive the drawing string and keep the
bag from slipping; the inner edge should be rounded
smooth. the bag should be increased in depth in propor-
tion to the increase of diameter; the head of the frame should
be carried up by a bevel two inches into the circle & the
rim separated accordingly to leave a space for the neck
to pass through on putting on the cover. A covering
or other covering 4 inches deep from the upper edge is put
round the frame, leaving an inch at the lower edge to fas-
ten a festoon or valance to. A ledge of Mahogany three
quarters of an inch thick and wide enough to cover the
edge and project to form a moulding, is fastened all round
the upper edge of the frame and mitred of course at the
corners. The cover is circular, it may be covered and made
entirely of tin 18 inches high from the straight line at the
ends: the ends of the cover made of seven eighths white pine
in two thicknesses the grain of inside thickness running
up and down; these ends connected by side pieces made
like the side pieces of the frame below, and secured at the
corners in the same manner; the circular top is covered
by strips of half inch pine running from head to foot;
the the breadths of which will vary according to the [illegible]
of the circle they cover; the edges, of course, bevelled so as to
joint. A covering of strong linen is drawn over these
strips glued & pasted and painted on the outside, the whole
top being neatly covered with any tapestry that the fancy
may suggest. The escape of the gas is prevented by
a cone groove the shape of which is given on the drawing, the
cone is one inch wide and three eighths deep. the hollow
is worked in the ledge on the upper edge of the frame, a
fine tongue is fitted into this hollow. the upper part
is then glued and the cover being immediately secured
thereon. When the glue dries the cone will be exactly in its
place; the whole lower edge of the cover including the cone,
is covered with [illegible] soft cloth, and the cover is made
fast when in use by two hasp hasps on each side made
on the same principle as the hasp of a trunk lock the
hasp being attached to the cover, the receiving plate
let into the side of the frame. The drawing shows
the top suspended by cords and counter weights. the cords
pass thro' pulleys fixed directly over them in the ceiling &
are then fastened to weights which are contained inside of
four hollow pillars which support the canopy and curtains,
the cover may attached by hinges on the back part like
the lid of a chest. The bottom of this apparatus is tin &
it rests on six legs 16 inches long three on each side. the
vapour is admitted thro' a two inch pipe running up
thro' the leg at the back part of the foot of the machine, the
vapour passes out thro' both the legs at the head of the ma-
chine: these legs may be made of inch pine 4 inches square
which will have a cavity of two inches; they are covered by
the drapery within an inch of the bottom & may have
some neat finish on the [illegible] of the leg they [illegible]; the
apparatus stands on a platform 4 inches high, the plat-
form form projects beyond the apparatus at the front side and
at each end, so as to leave room for a person to walk round,
the distance is left to the taste of the maker; the platform ex-
tends to the wall or partition at the back side of the machine ...
leaving a space to pass behind and adjust the oven. the plat-
form also assists in bracing the columns which sustain the
curtains, The two legs at the head are attached to
a wooden pipe of the same size which passes under the plat
form thro' the wall or partition in the rear & communi-
cates with a chimney or perpendicular spout of some height
out of doors. the tin pipe which runs thro' the leg at the
foot of the machine passes by an elbow under the platform
& communicates with the furnace which may be in the
cellar or out of doors; should there however be a fire
place in the room so situated as to answer, it will
save trouble; the furnace is heated by charcoal which
is burned in a small sheet iron stove, similar to that
used by tin manufacturers to heat their soldering irons,
a circular sheet iron stove is placed over this with a door
large enough to receive a vessel containing the materials
to be raised in vapour, this door slides upwards to be
raised or lowered at pleasure so as to admit a greater
or less quantity of air; a flange and short pipe is atta-
ched to the back of this stove or to the top of it, as the case
may be, which communicates with the tin pipe alrea-
dy mentioned. the fumes of the charcoal should have
a vent back and not be permitted to enter the machine
on account of the smoke. The patient reclines on a frame
made of two pieces of cherry or similar wood 6 inches wide
and one inch thick, the length of the inside of the machine
these pieces placed on edge on each side of the machine are
united by four stretching pieces of the same thickness and
reaching up to a range of [illegible] mortises spaced and finished like the edge of the apparatus last described.
the stretching piece at the head and foot frames 6 inches
from each end; the other two equally divided, the stre-
tching pieces lightened or hollowed out to within one inch
and half of the bottom; This frame can be taken out so as to
dry the girthing after using. Holes must of course be
made thro' the tin bottom to communicate with the
legs that are used for the vapour, the bottom is made
fast to the legs by nailing; these openings in the bottom
are covered by a piece of tin at each end 6 inches wide
and extending across the bottom, these pieces are edged
with strong wire and punched full of holes, in the wire
of one edge several hinge pieces are placed, which are
fastened by tinned nails or screws to the end pieces of
the frame, so far up as to make the tins form an angle
with the corner. The head cushion and suppor-
ter of this apparatus are made like the leap one on my
model, the cushion may be made larger and trimmed
with more taste, this apparatus is painted with ochre Portable Machine for the Limbs The bottom part is made of sheet tin, it is two feet long
by one foot wide and four inches deep, it has a stout
wire in the edge turned on the inside, the lid or top
is two inches deep and when closed laps over the bot-
tom one inch and is fastened by two hasps on each
side like a cannister, when in use the top is suppor-
ted by a light trap joint in each corner, similar to a
rule which when struck falls towards the centre within
the sides of the machine. The vapour is raised and
conveyed off in the same manner as the portable ma-
chine for the body, the lamp cup pipe &c may be
made smaller, the vapour is admitted thro' a [illegible]
hole close to the bottom at the end of the machine oppo-
[illegible]

site to where the limb is admitted, a flat pipe or passage
4 inches wide and half an inch high is soldered on the
bottom from this hole to the front of the Machine, a range
of small holes are punched in the half inch edge of this pas-
sage by which the vapour is spread thro' the Machine
without coming in a body in contact with the limb
by which it might be scalded ______

When the Machine is in use a space of 12 inches is
preserved by the wire joints between the edges of the
top and bottom; the vapour is confined by an oil cloth
prepared in the same manner as the cover of the portable Ma-
chine a circular opening is made in the end 10 inches
in diameter; the bottom of the circle being even with the
edge of the bottom, to the edge of which a bag is sewed, simi-
lar to the one put round the neck of the patient in the
other machine, like that laid in folds round the limb
and secured by a handkerchief. This oil cloth is
secured at the bottom by being tacked round the outside
of a wooden frame, which is made of pieces one inch wide
and half an inch thick; these pieces are fitted (with their
edges up and down) to the inside of the bottom; allowance
being made for the thickness of the oil cloth and for pie-
ces of the same breadth (one inch) and the thickness of
the wire projecting on the inner edge of the bottom.

This frame is dove tailed at the corners and fast-
ened by round headed screws, which pass thro' the sides
and ends thro' the filling up strips the thickness of the
wire already mentioned into the frame, the lower
edge of which is one inch from the bottom, and half an
inch from the passage which receives the vapour. The
top edge of the oil cloth is tacked to the edge of a frame
of the same breadth and thickness, which is fitted up flat
against the inside of the top of the lid or cover and fast-
ened 7190x July 31, 1832 and with round headed screws the top the frame is lapped half and half at the corners allowance having to be made for the thickness of the linen or oil cloth as the stiffening wire here is on the out side of the corner —

The escape pipe is made in joints and goes into the back part of the oil cloth, over the furnace pipe and close to the upper edge of the bottom secured in the same manner as that of the large Machine. A handle is fixed in the center of the top. A support for the limb is made of stout tin attached by a hinge to the wire in the edge of the bottom and under the opening for the limb; this support may be 8 inches long and 4 wide; be stuffed on the top, and turned inside of the machine when closed up; a cushion covered with oil cloth is also made for the heel to rest on, it is attached to a tin stand in the form of a stool; the feet going on each side of the vapour receiver, and one inch high, which keeps it half an inch from the hot pipe. The inside well painted with ochre the out side black japanned. the machine rests on two chairs.

References to improvement.

Plate 1st Figure A. large portable apparatus.
ditto .. ---- B. another view of the same.
ditto .. ditto C. Machine packed up.
ditto .. ditto D. Tin case for ditto.
ditto .. ditto E. Escape pipe drawn out.
ditto .. ditto F. Improved cup.
ditto .. ditto G. Lamp fixed for use.
ditto .. ditto H. ditto packed up.
ditto .. ditto I. Hitching rail & fastening with hole for [illegible]
Plate 2nd Figure A. Fixed apparatus,
ditto .. ditto B. Portable ditto for the Limb
ditto .. ditto C. Tin joint

[illegible] William Hall William [illegible]